US008295276B2

(12) United States Patent
De Heer

(10) Patent No.: US 8,295,276 B2
(45) Date of Patent: Oct. 23, 2012

(54) METHOD AND APPARATUS FOR TRANSPORTING MULTIPROTOCOL LABEL SWITCHING FRAMES OVER PHYSICAL COMMUNICATION LINKS

(75) Inventor: Arie Johannes De Heer, Hengelo (NL)

(73) Assignee: Alcatel Lucent, Paris (FR)

( * ) Notice: Subject to any disclaimer, the term of this patent is extended or adjusted under 35 U.S.C. 154(b) by 634 days.

(21) Appl. No.: 11/562,041

(22) Filed: Nov. 21, 2006

(65) Prior Publication Data
US 2008/0117895 A1   May 22, 2008

(51) Int. Cl.
*H04L 12/28* (2006.01)
(52) U.S. Cl. ........................................ 370/389; 709/219
(58) Field of Classification Search .................. 370/389, 370/466, 400, 395.5; 709/219
See application file for complete search history.

(56) References Cited

U.S. PATENT DOCUMENTS

| 7,436,828 | B2 * | 10/2008 | Betts et al. | 370/389 |
|---|---|---|---|---|
| 2005/0169275 | A1 * | 8/2005 | Jiang et al. | 370/392 |
| 2006/0023669 | A1 * | 2/2006 | Yamaura et al. | 370/335 |
| 2006/0209886 | A1 * | 9/2006 | Silberman et al. | 370/466 |
| 2007/0242676 | A1 * | 10/2007 | Fridman | 370/395.5 |

* cited by examiner

*Primary Examiner* — Robert Wilson
*Assistant Examiner* — Wei Zhao
(74) *Attorney, Agent, or Firm* — Wall & Tong, LLP

(57) ABSTRACT

The invention includes a method and apparatus for transporting a Multiprotocol Label Switching (MPLS) frame over a communication link. In the egress direction of communication, a method includes encapsulating the MPLS frame within a Generic Framing Procedure (GFP) frame, forming an augmented frame by adding at least one Ethernet Media Access Control (MAC) header field to the GFP frame, and transmitting the augmented frame over the communication link. In the ingress direction of communication, a method includes receiving an augmented frame over a communication link, removing at least one Ethernet Media Access Control (MAC) header field from the augmented frame to extract thereby a Generic Framing Procedure (GFP) frame, and decapsulating the MPLS frame from within the GFP frame.

20 Claims, 5 Drawing Sheets

METHOD AND APPARATUS FOR TRANSPORTING MULTIPROTOCOL LABEL SWITCHING FRAMES OVER PHYSICAL COMMUNICATION LINKS

FIELD OF THE INVENTION

The invention relates to the field of communication networks and, more specifically, to transport of Multi-Protocol Label Switching (MPLS) packets over physical links.

BACKGROUND OF THE INVENTION

There are many different packet-based technologies currently used in transport networks. One such packet-based technology is Multiprotocol Label Switching (MPLS), which supports transport of different traffic types (e.g., Internet Protocol (IP) packets and Asynchronous Transfer Mode (ATM) packets, and the like). MPLS supports quality of service guarantees, traffic engineering, protection mechanisms, and other functions. The transport of MPLS frames, however, requires use of another packet-based technology, such as Ethernet. Ethernet is a link layer protocol, enabling transport of Ethernet frames over cables and fibers without requiring use of another protocol. Ethernet, however, lacks support for many of the functions supported by MPLS, such as quality of service guarantees, traffic engineering, and protection mechanisms. In such networks, Ethernet adds a significant amount of overhead to MPLS packets. Disadvantageously, however, since transport of MPLS frames over Ethernet is only over a single link, much of the Ethernet overhead is not used, thereby decreasing the efficiency of MPLS over Ethernet.

SUMMARY OF THE INVENTION

Various deficiencies in the prior art are addressed through the invention of a method and apparatus for transporting a Multiprotocol Label Switching (MPLS) frame over a communication link. In the egress direction of communication, a method includes encapsulating the MPLS frame within a Generic Framing Procedure (GFP) frame, forming an augmented frame by adding at least one Ethernet Media Access Control (MAC) header field to the GFP frame, and transmitting the augmented frame over a communication link. In the ingress direction of communication, a method includes receiving an augmented frame over a communication link, removing at least one Ethernet Media Access Control (MAC) header field from the augmented frame to extract thereby a Generic Framing Procedure (GFP) frame, and decapsulating the MPLS frame from within the GFP frame.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables transport of Multiprotocol Label Switching (MPLS) frames over physical communication links. The present invention utilizes a combination of Generic Frame Protocol (GFP) framing (encapsulation) and Ethernet MAC framing (encapsulation) to transport MPLS frames over physical communication links. In one embodiment, the present invention utilizes a combination of GFP framing and Ethernet MAC framing in order to transport MPLS frames over Ethernet-based physical communication links. The present invention enables transport of MPLS frames over physical communication links in a manner for reducing transport overhead. Since GFP frames support encapsulation of multiple client packets, the present invention enables transport of multiple client signals over physical communication links.

Figure 1:
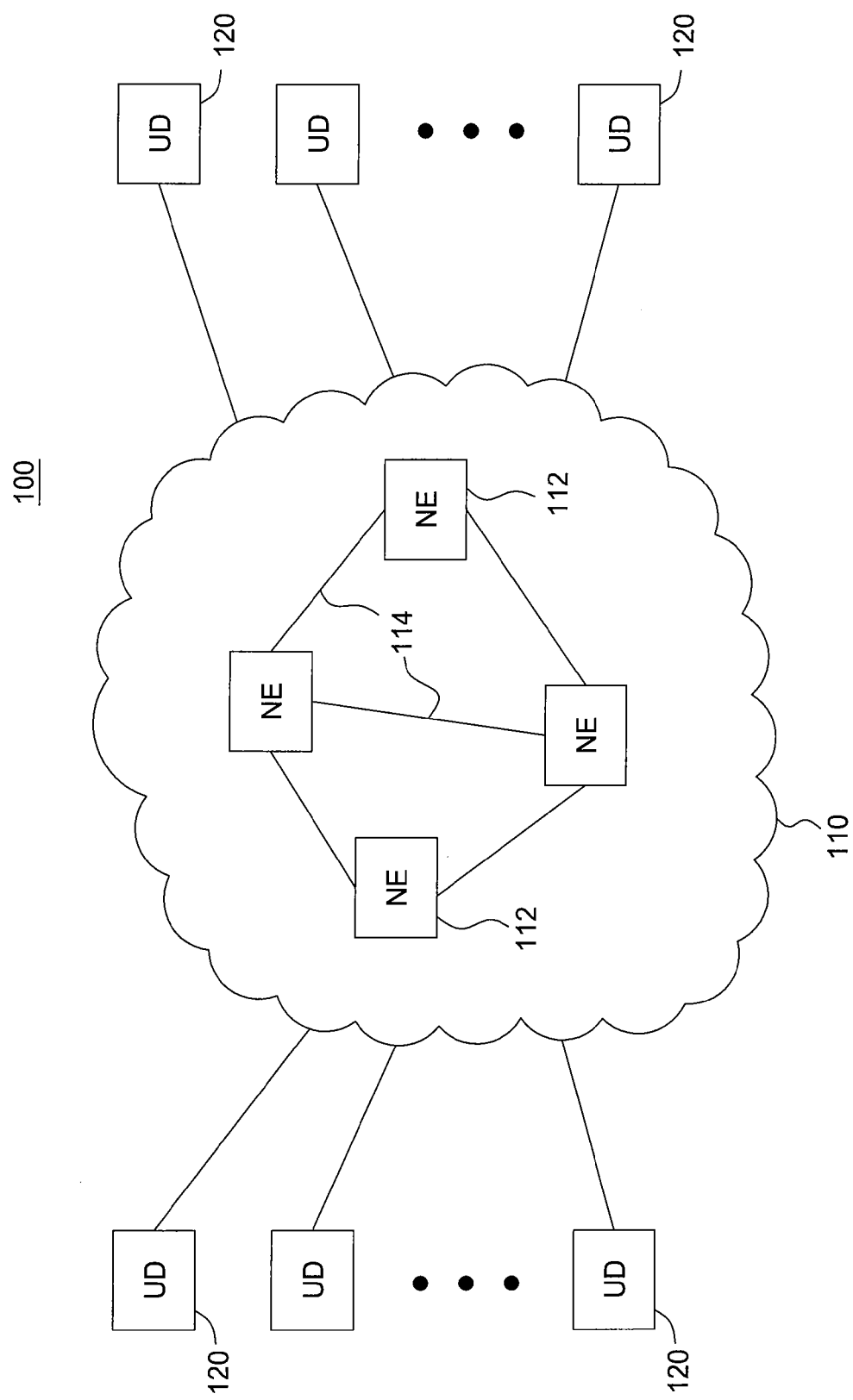
FIG. 1 depicts a high-level block diagram of a communication network.

FIG. 1 depicts a high-level block diagram of a communication network. Specifically, communication network 100 includes a transport network (TN) 110 and a plurality of user devices (UDs) 120 (collectively, UDs 120). The TN 110 transports communications between user devices (UDs) 120, and may support various associated functions, services, and the like, as well as various combinations thereof. The TN 110 includes a plurality of network elements (NEs) 112 (collectively, NEs 112) adapted for communicating using a plurality of communication paths (CPs) 114 (collectively, CPs 114). The UDs 120 may include any user devices operable for communicating over TN 110 (e.g., wireline and wireless phones, computers, and the like, as well as various combinations thereof).

The NEs 112 include network elements supporting MPLS functions (e.g., framing/deframing), GFP functions (e.g., framing/deframing), Ethernet MAC functions (e.g., framing/deframing), and Ethernet physical interfaces, and the like, as well as various combinations thereof. The NEs 112 may support various other functions, interfaces, and the like, as well as various combinations thereof, including various functions, interfaces, and the like depicted and described herein. In other words, NEs 112 may include label routers (e.g., label edge routers (LERs), label switch routers (LSRs), and the like), Ethernet switches, as well as network elements support various combinations of functions typically supported by such network elements, and the like, as well as various combinations thereof.

Figure 2:
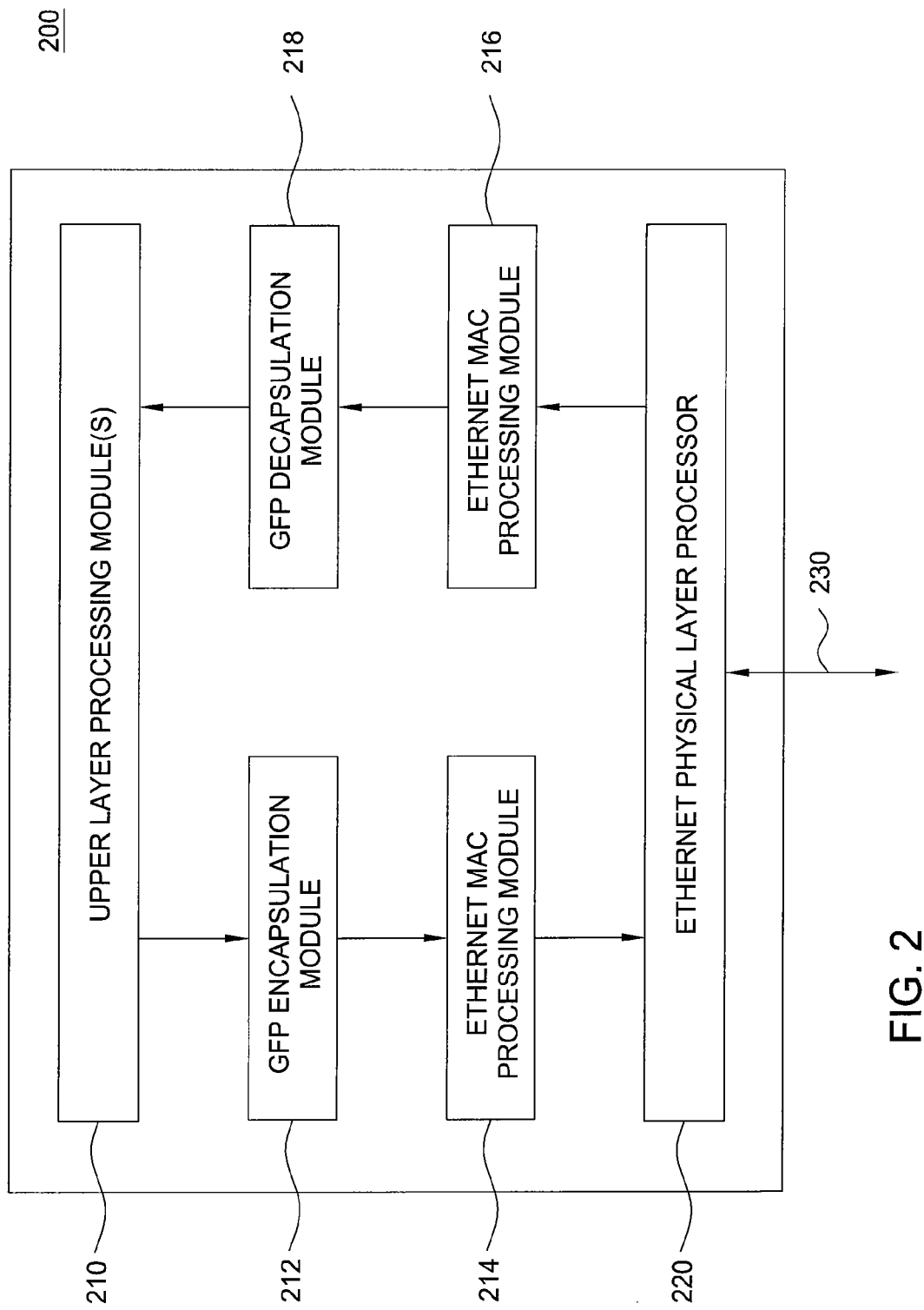
FIG. 2 depicts a high-level block diagram of a communication node of the communication network of FIG. 1.

FIG. 2 depicts a high-level block diagram of a communication node of the communication network of FIG. 1. The communication node 200 includes an upper layer processing module(s) 210, a GFP encapsulation module 212, an Ethernet MAC processing module 214, an Ethernet MAC header removal module 216, a GFP decapsulation module 218, and an Ethernet physical layer processing module 220. The Ethernet physical layer processing module 220 transmits/receives signals over an associated communication link 230 (illustratively, one of the CPs 114).

As depicted in FIG. 2, in the egress direction, upper layer processing module(s) 210, GFP encapsulation module 212, Ethernet MAC header addition module 214, and Ethernet physical layer processing module 220 cooperate to transmit MPLS frames over communication link 230 using Ethernet physical layer processing. As depicted in FIG. 2, in the ingress direction, Ethernet physical layer processing module 220, Ethernet MAC header removal module 216, GFP decapsulation module 218, and upper layer processing module(s) 210 cooperate to process frames transmitted over communication link 230 using Ethernet physical layer processing in order to extract associated MPLS frames.

As depicted in FIG. 2, in the egress direction, upper layer processing module(s) 210 processes client signals to generate associated MPLS frames. In one embodiment, upper layer processing module(s) 210 may process a client signal such as an IP packet, an ATM packet, and like client signals, as well as various combinations thereof, to encapsulate the client signal within an MPLS packet. In one embodiment, upper layer processing module(s) 210 processes the MPLS frame in order to perform label switching. Although omitted for purposes of clarity, upper layer processing module(s) 210 may receive the MPLS frame from one or more other processing modules additional processing. The upper layer processing module(s) 210 provides the MPLS packet to GFP encapsulation module 212.

The GFP encapsulation module 212 encapsulates the MPLS frame within a GFP packet. In one embodiment, GFP encapsulation module 212 encapsulates the MPLS frame within a GFP packet according to the International Telecommunications Module-Telecommunication (ITU-T) G.7041 recommendation (e.g., G.7041-200508-P), which is incorporated in entirety herein. In one embodiment, encapsulation of an MPLS frame within a GFP frame includes prepending a payload header to the MPLS frame and prepending a core header to the payload-header. In one embodiment, encapsulation of an MPLS frame within a GFP frame optionally includes appending a frame check sequence (FCS) to the MPLS frame. The GFP encapsulation module 212 provides the GFP frame to Ethernet MAC header addition module 214.

The Ethernet MAC header addition module 214 adds a subset of the Ethernet MAC header fields to the GFP frame. In one embodiment, Ethernet MAC header addition module 214 adds a subset of the Ethernet MAC header fields defined in the Institute of Electrical and Electronics Engineers (IEEE) 802.3 recommendation (e.g., 802.3-2003), which is incorporated in entirety herein. In one embodiment, the subset of Ethernet MAC header fields added to the GFP frame includes a start frame delimiter (SFD) and a preamble. The Ethernet MAC header addition module 214 prevents addition of the source/destination MAC address header fields to the GFP frame. The Ethernet MAC header addition module 214 provides the Ethernet frame to Ethernet physical layer processing module 220.

The Ethernet physical layer processing module 220 processes the Ethernet frame for transmission over communication link 230. In one embodiment, Ethernet physical layer processing module 220 processes the Ethernet frame for transmission over communication link 230 according to physical layer processing defined in the IEEE 802.3 recommendation (e.g., 802.3-2003). The Ethernet physical layer processing module 220 transmits the Ethernet frame over communication link 230. The Ethernet physical layer processing module 220 transmits the Ethernet frame to another communication node supporting functions adapted for performing reverse processing (i.e., in the ingress direction) required to extract the MPLS frame from the Ethernet frame.

As depicted in FIG. 2, in the ingress direction, the Ethernet physical layer processing module 220 receives an Ethernet frame over communication link 230. The Ethernet physical layer processing module 220 processes the received Ethernet frame according to physical layer processing defined in the IEEE 802.3 recommendation (e.g., 802.3-2003). The Ethernet physical layer processing module 220 provides the Ethernet frame to Ethernet MAC header removal module 216.

The Ethernet MAC header removal module 216 removes Ethernet MAC header fields from the Ethernet frame in order to extract the GFP frame. In one embodiment, Ethernet MAC header removal module 216 removes one or more Ethernet MAC header fields defined in the IEEE 802.3 recommendation (e.g., 802.3-2003). In one embodiment, Ethernet MAC header fields removed from the Ethernet frame may include a SFD and a preamble. The Ethernet MAC header removal module 216 is not required to remove the source/destination MAC address header fields from the Ethernet frame since such Ethernet MAC header fields are prevented from being added to the GFP frame on the transmission side. The Ethernet MAC header removal module 216 provides the extracted GFP frame to GFP decapsulation module 218.

The GFP decapsulation module 218 decapsulates the GFP frame to extract the MPLS frame. In one embodiment, GFP decapsulation module 218 decapsulates the GFP frame according to the ITU-T G.7041 recommendation (e.g., G.7041-200508). In one embodiment, decapsulation of the GFP frame includes removing a core header from the payload of the GFP frame, and removing a payload header from the payload of the GFP frame in order to extract the MPLS frame conveyed by the GFP frame. In one embodiment, decapsulation of the GFP frame optionally includes removing a FCS from the GFP frame in order to extract the MPLS frame conveyed by the GFP frame. The GFP decapsulation module 218 provides the extracted MPLS frame to upper layer processing module(s) 210.

The upper layer processing module(s) 210 receives the MPLS frame from GFP decapsulation module 218. In one embodiment, upper layer processing module(s) 210 processes the MPLS frame in order to perform label switching. In one embodiment, upper layer processing module(s) 210 processes the MPLS frame in order to extract a client signal (e.g., IP packet, ATM packet, and the like, as well as various combinations thereof) conveyed by the MPLS frame. Although omitted for purposes of clarity, upper layer processing module(s) 210 may provide the MPLS frame to one or more other processing modules for additional processing.

In general, transmission of Ethernet frames by a transmitter in a manner enabling identification of the Ethernet frames on a receiver may require insertion of inter-frame gaps between Ethernet frames conveyed over communication link 230. Depending on the implementation, as well as on the type, size, and rate of client signals, inter-frame gaps may or may not be required. In one embodiment, in the egress direction, Ethernet MAC header addition module 214 may add an inter-frame gap between consecutive Ethernet frames. In one embodiment, in the ingress direction, Ethernet MAC header removal module 216 may remove an inter-frame gap between consecutive Ethernet frames.

Although primarily depicted and described herein with respect to specific formats of MPLS frames, GFP frames, and Ethernet frames, various other formats of MPLS frames, GFP frames, and Ethernet frames may be used in accordance with the present invention. Although primarily depicted and described herein with respect to specific Ethernet MAC header fields used to augment GFP frames for transmitting MPLS frames over Ethernet, various other combinations of Ethernet MAC header fields may be used to augment GFP frames for transmitting MPLS frames over Ethernet. The operation of communication node 200 may be better understood with respect to methods 300 and 400 of FIG. 3 and FIG. 4, respectively.

Figure 3:
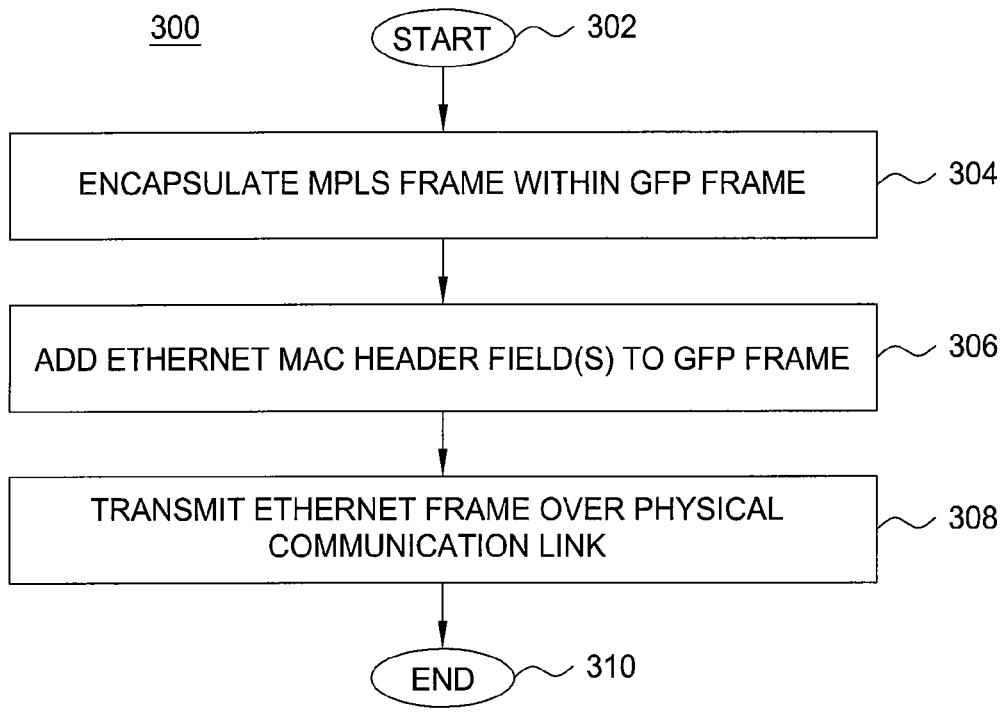
FIG. 3 depicted a method according to one embodiment of the present invention for encapsulating MPLS frames.

FIG. 3 depicts a method according to one embodiment of the present invention for encapsulating MPLS frames. Specifically, method 300 includes a method for transmitting an MPLS frame over a physical communication link, wherein the MPLS frame is transmitted according to an Ethernet physical layer specification. Although primarily depicted and described herein as being performed serially, at least a portion of the steps of method 300 may be performed contemporaneously, or in a different order than presented in FIG. 3. The method 300 begins at step 302 and proceeds to step 304.

At step 304, the MPLS frame is encapsulated within a GFP frame. At step 306, one or more Ethernet MAC header fields are added to the GFP frame to form thereby an Ethernet frame. As described herein, only a subset of defined Ethernet MAC header fields are added to the GFP frame (i.e., at least the source/destination MAC address header fields are prevented from being added to the GFP frame). At step 308, the Ethernet frame is transmitted over a physical communications link. As described herein, the Ethernet frame may be transmitted over an Ethernet-based physical communication link. At step 310, method 300 ends.

Figure 4:
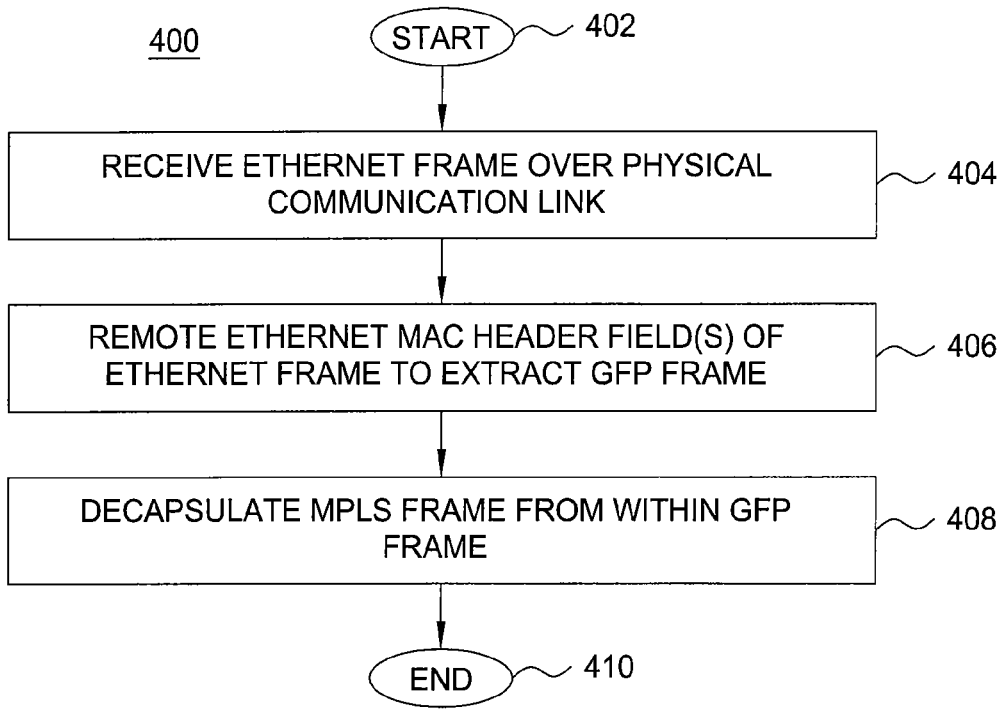
FIG. 4 depicted a method according to one embodiment of the present invention for decapsulating MPLS frames.

FIG. 4 depicts a method according to one embodiment of the present invention for decapsulating MPLS frames. Specifically, method 400 includes a method for processing an Ethernet frame conveying an MPLS frame in order to extract the MPLS frame from the Ethernet frame, wherein the Ethernet frame is received according to an Ethernet physical layer specification. Although primarily depicted and described herein as being performed serially, at least a portion of the steps of method 400 may be performed contemporaneously, or in a different order than presented in FIG. 4. The method 400 begins at step 402 and proceeds to step 404.

At step 404, an Ethernet frame is received over an Ethernet-based physical communication link. At step 406, one or more Ethernet MAC header fields are removed from the Ethernet frame, thereby extracting a GFP frame to which the one or more Ethernet MAC header fields were appended. As described herein, since source/destination MAC address header fields are prevented from being added to the GFP frame, Ethernet MAC header fields such as SFD and preamble may be removed. At step 408, the MPLS frame is decapsulated from within the GFP frame. The MPLS frame may then be processed (e.g., to perform label switching, extract associated client signals, and the like, as well as various combinations thereof). At step 410, method 400 ends.

Figure 5:
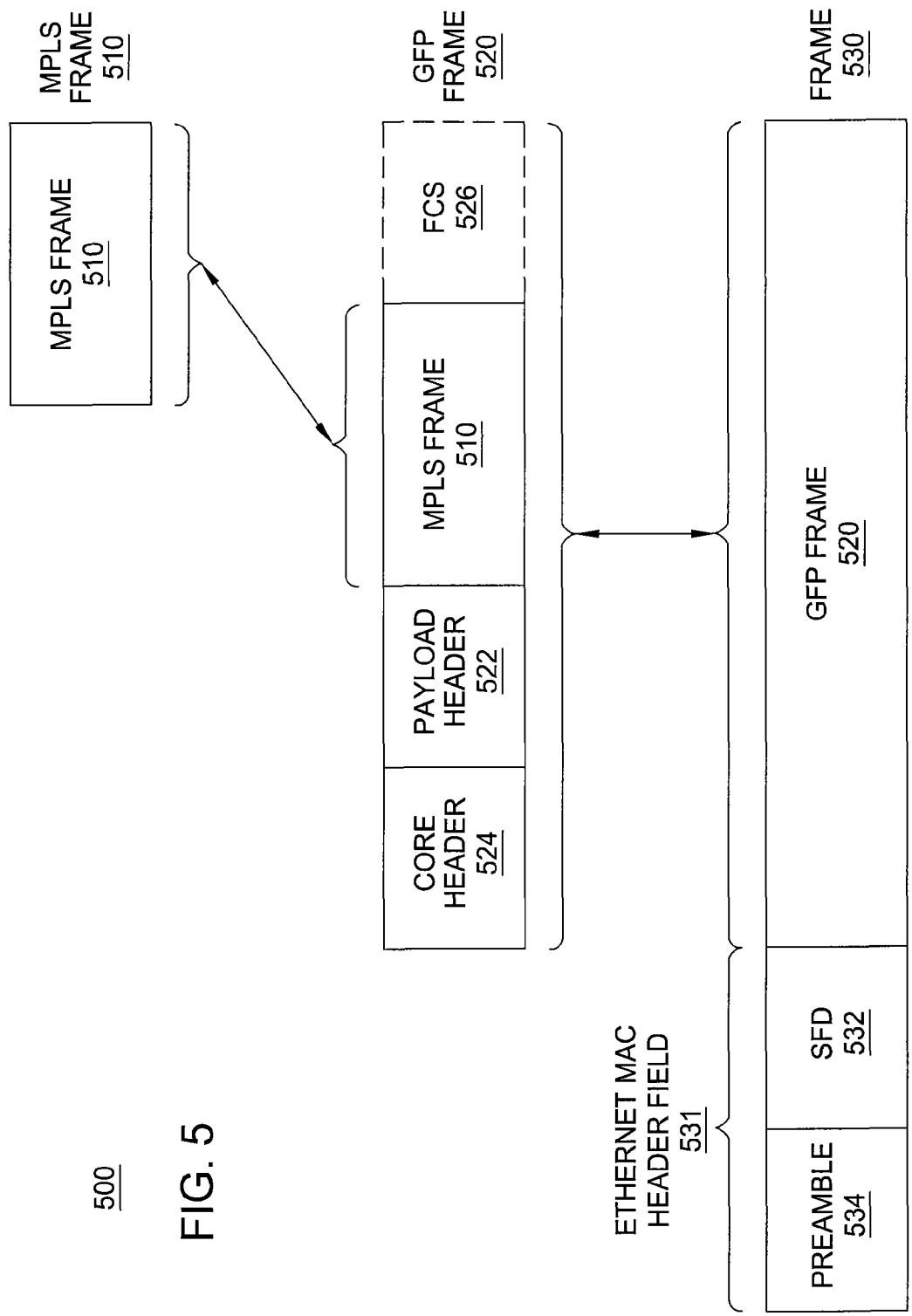
FIG. 5 depicts data structures according to one embodiment of the present invention.

FIG. 5 depicts data structures according to one embodiment of the present invention. Specifically, data structures 500 include an MPLS frame 510, a GFP frame 520, and an Ethernet frame 530. For communications in the egress direction, as described herein with respect to FIG. 2 and FIG. 3, MPLS frame 510 is encapsulated within GFP frame 520, and GFP frame 520 is augmented using a subset of the Ethernet MAC header fields, thereby forming Ethernet frame 530. For communications in the ingress direction, as described herein with respect to FIG. 2 and FIG. 4, Ethernet frame 530 is processed to remove the Ethernet MAC header fields (thereby extracting GFP frame 520 from the Ethernet frame 530), and GFP frame 520 is processed to decapsulate MPLS frame 510 from GFP frame 520 (thereby extracting MPLS frame 510 from GFP frame 530).

Although omitted for purposes of clarity, MPLS frame 510 may include an MPLS frame payload and an associated MPLS frame header. The MPLS frame payload may include client packets such as IP packets, ATM packets, and the like. For example, in one embodiment, in which the MPLS payload includes an IP packet, the MPLS payload may include client data as well as additional headers required for transmission of the client data, such as a Transmission Control Protocol (TCP) header, and an IP header. The MPLS frame header may include one or more MPLS label stack entries, where each label stack entry includes a label field, a quality of service field, a bottom-of-stack flag, and a time-to-live field.

As depicted in FIG. 5, MPLS frame 510 is encapsulated within GFP frame 520. The GFP frame 520 includes a GFP frame payload and a GFP frame header. The GFP frame payload includes MPLS frame 520 and a payload header 522 which is prepended to MPLS frame 510. Although omitted for purposes of clarity, the payload header 522 may include a type field indicating the type of content conveyed by GFP frame 520, a type header error control (tHEC) field, one or more GFP extension headers, and an extension header error control (eHEC) field. The GFP frame header includes a core header 524 which is prepended to payload header 522. Although omitted for purposes of clarity, the core header 524 may include a packet data unit (PDU) length indicator (PLI) field and a core header error check (cHEC) field. In one embodiment, GFP frame 520 may optionally include a FCS 526 which is appended to the GFP frame.

As depicted in FIG. 5, GFP frame 520 is modified to include a subset of the available Ethernet MAC header fields, forming thereby an Ethernet frame (which may also be referred to herein as an augmented GFP frame or, more generally, as an augmented frame). As depicted in FIG. 5, Ethernet frame 530 includes an Ethernet frame payload and an Ethernet frame header. The Ethernet frame payload includes the GFP frame 520. The Ethernet frame header includes a subset of the available Ethernet MAC header fields (illustratively, Ethernet MAC header fields 531). The Ethernet MAC header fields 531 include a SFD 532 prepended to the Ethernet frame payload, and a preamble 534 prepended to the SFD 532. Although depicted and described with respect to specific Ethernet MAC header fields 531, other combinations of Ethernet MAC header fields may be used to form Ethernet frame 530.

Figure 6:
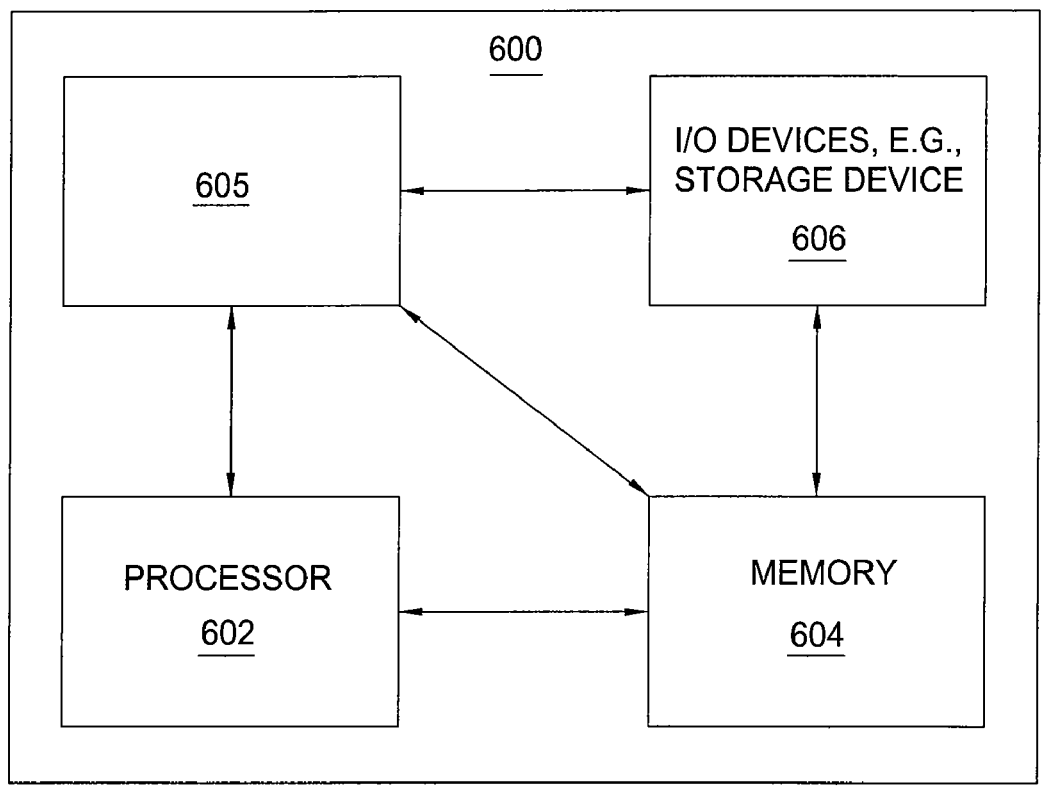
FIG. 6 depicts a high-level block diagram of a general-purpose computer suitable for use in performing at least a portion of the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), an encapsulation/decapsulation module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

The present invention may be implemented in software and/or in a combination of software and hardware, e.g., using application specific integrated circuits (ASIC), a general purpose computer or any other hardware equivalents. In one embodiment, the present encapsulation/decapsulation module or process 605 can be loaded into memory 604 and executed by processor 602 to implement the functions as discussed above. As such, encapsulation/decapsulation process 605 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for transporting a Multiprotocol Label Switching (MPLS) frame over a communication link, said method comprising:
   encapsulating the MPLS frame within a Generic Framing Procedure (GFP) frame, wherein the GFP frame comprises the MPLS frame, a payload header, and a core header;
   forming an augmented frame by disabling addition of source/destination of Ethernet Media Access Control (MAC) address header fields and prepending at least a subset of Ethernet Media Access Control (MAC) header fields including corresponding start frame delimiter (SFD) and preamble to the GFP frame; and
   transmitting the augmented frame over the communication link.

2. The method of claim 1, wherein the step of encapsulating the MPLS frame within the GFP frame is performed according to International Telecommunications Module-Telecommunication (ITU-T) recommendation G.7041 (2006).

3. The method of claim 1, wherein the at least one Ethernet MAC header field comprises at least one of a start frame delimiter (SFD) and a preamble.

4. The method of claim 1, wherein the step of transmitting the augmented frame over the communication link is performed according to Institute of Electrical and Electronics Engineers (IEEE) recommendation 802.3 (2006).

5. The method of claim 1, further comprising:
   inserting an inter-frame gap between the augmented frame and a subsequent augmented frame.

6. An apparatus for transporting a Multiprotocol Label Switching (MPLS) frame over a communication link, said apparatus comprising:
   means for encapsulating the MPLS frame within a Generic Framing Procedure (GFP) frame, wherein the GFP frame comprises the MPLS frame, a payload header, and a core header;
   means for forming an augmented frame by disabling addition of source/destination of Ethernet Media Access Control (MAC) address header fields and prepending at least a subset Ethernet Media Access Control (MAC) header fields including corresponding start frame delimiter (SFD) and preamble to the GFP frame; and
   means for transmitting the augmented frame over the communication link.

7. The apparatus of claim 6, wherein the means for encapsulating the MPLS frame within the GFP frame operates according to International Telecommunications Module-Telecommunication (ITU-T) recommendation G.7041 (2006).

8. The apparatus of claim 6, wherein the at least one Ethernet MAC header field comprises at least one of a start frame delimiter (SFD) and a preamble.

9. The apparatus of claim 6, wherein the means for transmitting the augmented frame over the communication link operates according to Institute of Electrical and Electronics Engineers (IEEE) recommendation 802.3 (2006).

10. The apparatus of claim 6, further comprising:
    means for inserting an inter-frame gap between the augmented frame and a subsequent augmented frame.

11. A method for transporting a Multiprotocol Label Switching (MPLS) frame over a communication link, said method comprising:
    receiving an augmented frame over the communication link, wherein the augmented frame comprises an augmented frame header and an augmented frame payload, wherein the augmented frame header comprises at least a subset of Ethernet Media Access Control (MAC) header fields including corresponding start frame delimiter (SFD) and preamble, wherein the augmented frame payload comprises a Generic Framing Procedure (GFP) frame and addition of source/destination of Ethernet Media Access Control (MAC) address header fields to the GFP frame is disabled;
    removing the at least one Ethernet MAC header field from the augmented frame to extract thereby the GFP frame, wherein the GFP frame comprises the MPLS frame, a payload header, and a core header; and
    decapsulating the MPLS frame from within the GFP frame.

12. The method of claim 11, wherein the step of receiving the augmented frame over the communication link is performed according to Institute of Electrical and Electronics Engineers (IEEE) recommendation 802.3 (2006).

13. The method of claim 11, wherein the at least one Ethernet MAC header field comprises at least one of a start frame delimiter (SFD) and a preamble.

14. The method of claim 11, further comprising:
    removing an inter-frame gap between the augmented frame and a previous augmented frame.

15. The method of claim 11, wherein the step of decapsulating the MPLS frame from within the GFP frame is performed according to International Telecommunications Module-Telecommunication (ITU-T) recommendation G.7041 (2006).

16. An apparatus for transporting a Multiprotocol Label Switching (MPLS) frame over a communication link, said apparatus comprising:
    means for receiving an augmented frame over the communication link, wherein the augmented frame comprises an augmented frame header and an augmented frame payload, wherein the augmented frame header comprises at least a subset of Ethernet Media Access Control (MAC) header fields including corresponding start frame delimiter (SFD) and preamble, wherein the augmented frame payload comprises a Generic Framing Procedure (GFP) frame and addition of source/destination of Ethernet Media Access Control (MAC) address header fields to the GFP frame is disabled;
    means for removing the at least one Ethernet MAC header field from the augmented frame to extract thereby the GFP frame, wherein the GFP frame comprises the MPLS frame, a payload header, and a core header; and
    means for decapsulating the MPLS frame from within the GFP frame.

17. The apparatus of claim 16, wherein the means for receiving the augmented frame over the communication link operates according to Institute of Electrical and Electronics Engineers (IEEE) recommendation 802.3 (2006).

18. The apparatus of claim 16, wherein the at least one Ethernet MAC header field comprises at least one of a start frame delimiter (SFD) and a preamble.

19. The apparatus of claim 16, further comprising:
    means for removing an inter-frame gap between the augmented frame and a previous augmented frame.

20. The apparatus of claim 16, wherein the means for decapsulating the MPLS frame from within the GFP frame operates according to International Telecommunications Module-Telecommunication (ITU-T) recommendation G.7041 (2006).

* * * * *